United States Patent

Tardoskegyi et al.

[11] 3,710,759
[45] Jan. 16, 1973

[54] WIPER MEANS FOR LIQUID FLUX APPLYING APPARATUS

[75] Inventors: Louis V. Tardoskegyi, Montreal; Donald A. Elliott, Brossard, Quebec, both of Canada

[73] Assignee: Electrovert Manufacturing Co. Ltd., Montreal, Quebec, Canada

[22] Filed: Nov. 12, 1970

[21] Appl. No.: 88,557

[52] U.S. Cl. ............... 118/123, 118/109, 118/410, 228/37
[51] Int. Cl. ................ B05c 11/02, H05k 3/34
[58] Field of Search ........ 118/123, 109, 410; 228/37, 228/35, 36

[56] References Cited

UNITED STATES PATENTS

| | | | |
|---|---|---|---|
| 3,135,630 | 6/1964 | Bielinski et al. | 118/410 |
| 3,407,984 | 10/1968 | Walker | 228/37 |
| 3,439,854 | 4/1969 | Walker | 228/37 X |
| 254,494 | 3/1882 | Miner | 118/123 |
| 459,295 | 9/1891 | Leiman | 118/123 |
| 691,700 | 1/1902 | Foster | 118/123 |
| 3,027,867 | 4/1962 | Morse et al. | 118/109 |
| 2,817,312 | 12/1957 | Westby | 118/123 X |

*Primary Examiner*—James Kee Chi
*Attorney*—McGlew & Tuttle

[57] ABSTRACT

A flux coater is arranged to apply liquid flux to the undersurfaces of substantially flat workpieces moved thereover along a path of workpiece travel. A brush is mounted on the coater to extend across the path of travel downstream of the point of flux application, and is mounted for pivotal movement between an active position, in which it contacts the flux coated surfaces of the workpieces to wipe excess flux therefrom, and an inactive position in which it extends downwardly into the flux in the coater. The mounting means for the brush provide for ready and easy adjustment of the effective height of the brush, and furthermore limit movement of the brush to each of the inactive and inactive positions.

7 Claims, 4 Drawing Figures

PATENTED JAN 16 1973 3,710,759

INVENTORS
LOUIS V. TARDOSKEGYI
DONALD A. ELLIOTT
BY
McGlew & Toren
ATTORNEYS

WIPER MEANS FOR LIQUID FLUX APPLYING APPARATUS

BACKGROUND OF THE INVENTION

In the pretinning and solder coating of substantially flat workpieces, such as printed circuit boards, they workpiece surfaces initially have a flux coating applied thereto. The flux coating is later removed and a solder coating is applied to the previously flux coated surfaces. In present day technology, the flux coating is usually applied to the workpieces either by means of what is known as a "foam fluxer", in which the workpieces are passed through a foam of liquid flux, or by means of a "wave fluxer", in which the workpieces are passed through or in contact with a standing wave of liquid flux.

In production line apparatus, the printed circuit boards, after being fluxed with liquid foam, are heated to remove volatile constituents of the flux coating, after which the printed circuit boards are preheated before being pretinned or solder coated. However, difficulty has been experienced in obtaining a uniform coating of liquid flux over a surface of a printed circuit board during such production line operation, both when a foam fluxer is used and when a wave fluxer is used.

When using either type of fluxer or flux coater, the flux normally is applied to the bottom or undersurface of a printed circuit board. When the bottom surface of a printed circuit board is flux coated by a foam fluxer, bubbles of foam flux remain in that state throughout travel of the printed circuit board to a wave soldering machine, even though the printed circuit board, traveling to the wave soldering machine, passes over various heating arrangements. These bubbles contain vapors of alcohol or other solvent, which must be evaporated by heating and bursting of the bubbles before the printed circuit board can be preheated. While no bubbles are evolved on the fluxed bottom surface of the printed circuit board when the printed circuit board is fluxed by a wave fluxer, nevertheless there still remains the problem of obtaining a uniform coating of the flux on the surface of the printed circuit board.

SUMMARY OF THE INVENTION

This invention relates to the flux coating of flat workpieces prior to pretinning and solder coating thereof and, more particularly, to novel and improved apparatus for obtaining a uniform coating of liquid flux, free of bubbles and the like, on surfaces of the workpieces.

In accordance with the invention, a substantially flat workpiece, such as a printed circuit board, is moved along a path of travel over a flux coater, which may be either a foam fluxer or a wave fluxer, and has a coating of liquid flux applied to a surface thereof, generally to the bottom or undersurface thereof. Immediately after being coated with liquid flux, the coated surface of the workpiece is subjected to the action of a brush extending across the path of travel, and this brush wipes excess flux from the coated surface and, in case any bubbles are included in the flux coating, either removes or bursts these bubbles. When not in operation, the brush is moved from an upwardly extending position, and where it can operatively engage the workpieces, to a downwardly extending position in which the brush bristles are inserted into the liquid flux to maintain the bristles flexible.

More particularly, the liquid flux container of either a foam fluxer or a wave fluxer has mounted thereon a pair of brackets, one on either side of the path of travel of a workpiece over the fluxer, these brackets being positioned downstream in the direction of movement of the workpieces. The brackets have upwardly extending sloping edges which are formed with a series of notches therealong, and these notches interchangeably receive a pivot shaft for a brush extending transversely of the path of travel of the workpieces between the brackets. A pair of notches adjacent to the pair then supporting the pivot shaft support a stop member which is engageable with either the brush or with a member fixed to the pivot of the brush, to limit pivotal movement of the brush between its active position, in which it extends upwardly in a leading direction to contact the workpieces, or an inactive position, in which it extends downwardly and in a trailing direction with its bristles immersed in the liquid flux in the container. The brush may be readily pivoted by hand between its active and inactive positions. The liquid flux wiped from the coated workpiece surface by the brush drains back into the flux container or pot, so that the excess flux will not drip onto preheaters and the like located further along the production line. This reduces or eliminates a fire hazzard, particularly when a rosin foam flux is being used, in addition to which the preheaters remain clean and there is a saving in cost due to reduction in the amount of flux used.

The brush not only assures a uniform flux coating of the coated surface of the workpiece, but also sweeps bubbles from the coated surface or bursts the bubbles, when the brush is used with a foam fluxer. Furthermore, when the brush is in its inactive position, the flux coater can be covered to avoid evaporation of solvent in the liquid flux. Additionally, when it is desired to restart the operation, the flux draining brush, when a rosin flux in a solvent is used, is not stiff with gummy rosin flux residues.

An object of the invention is to provide an improved apparatus for assuring a uniform liquid flux coating on substantially flat workpieces to be pretinned or solder coated.

Another object of the invention is to provide such an apparatus which assures removal of liquid flux bubbles and the like from a flux coated surface.

A further object of the invention is to provide such an apparatus in which there is a reduction in the amount of liquid flux required to coat a substantially flat workpiece.

Yet another object of the invention is to provide such an apparatus including a flux draining brush which, when not being used, may be pivoted to immerse its bristles in liquid flux in a container to maintain the bristles flexible.

For an understanding of the principles of the invention, reference is made to the following description of a typical embodiment thereof as illustrated in the accompanying drawing.

BRIEF DESCRIPTION OF THE DRAWING

In the drawing:

FIG. 2 is a transverse sectional view of the wave fluxer shown in FIG. 1, illustrating the flux draining brush in the inactive position with the wave fluxer also in the non-operating condition;

FIG. 3 is a transverse sectional view on the line 3—3 of FIG. 1 illustrating the wave fluxer and the flux draining brush during operation of the wave fluxer to flux coat a printed circuit board or the like.

DESCRIPTION OF THE PREFERRED EMBODIMENT

Figure 1:
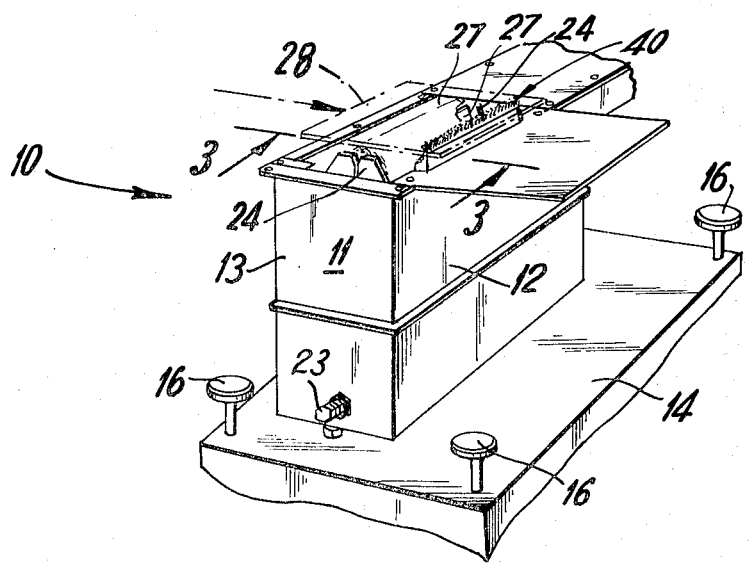
FIG. 1 is a perspective view of a wave fluxer having the invention incorporated therein.
Figures 2, 3:
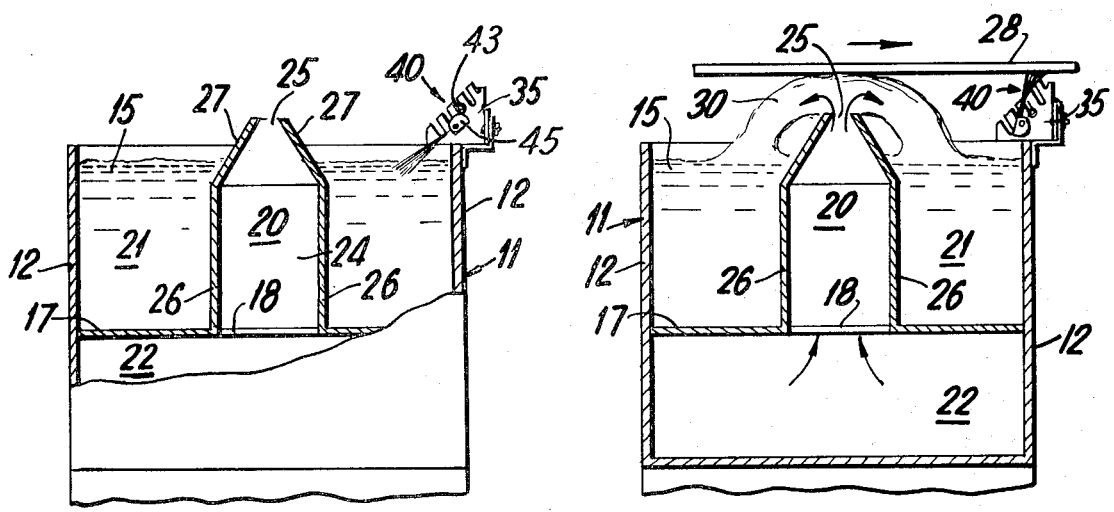

Referring to FIGS. 1, 2 and 3, the invention is illustrated as incorporated in a wave fluxer 10 which is a commercially available unit known as the "FW1 Fluxwave Applicator", sold by Electrovert Inc. and described, for example, in Bulletin 08R of November 1968. Wave fluxer 10 includes a liquid flux container 11 having end walls 12, side walls 13 and an open top, container 11 being mounted on a support base 14 provided with suitable height adjusting means generally indicated at 16. Container 11 is formed with a generally horizontal partition 17 substantially midway of its height, partition 17 being formed with a rectangular opening 18 extending transversely of container 11. Partition 17 divides container 10 into an upper section 21 and a lower section 22, and lower section 22 is provided with a suitable drain 23.

A nozzle 20 extends upwardly from partition 17, and has its lower end co-extensive with the opening 18, nozzle 20 being formed by vertical side walls 24 and vertical end walls 26. The upper portions of end walls 26 slope toward each other, as indicated at 27, to define a relatively narrow and elongated nozzle discharge opening 25 extending transversely of the path of travel of workpieces. Container 11 contains a supply of liquid flux 15, and this supply may be continuously replenished from a suitable source, which has not been shown. A recirculating pump (not shown) circulates liquid flux 15 from upper section 21 through an aperture (not shown) in partition 17 into lower section 22, so that the flux in the lower section is under pressure and flows upwardly through opening 18 and nozzle 20 to overflow from nozzle outlet 25 to form a double sided standing wave of liquid flux as illustrated at 30 in FIG. 3, the height of wave 30 being readily adjustable by adjusting the speed of the recirculating pump motor. The flux wave 30 is, as stated, a double sided wave, and has a smooth laminar flow so that the meniscus effect of the liquid flux, induced by the double-sided wave, operates, in conjunction with precise control of the wave height, to eliminate overflow of flux on the upper surface of even the thinnest substantially flat workpiece passed over and in contact with wave 30.

In operation of the apparatus as so far described, printed circuit boards 28 are passed along a path of travel in the direction of the arrows in FIGS. 1 and 3, the boards being supported either directly or indirectly by suitable conveyor means. As the printed circuit boards move across flux wave 30, the wave spreads a uniform film of liquid flux on the undersurfaces thereof. The force of the wave and the capillary action of the liquid flux promote excellent through-hole penetration of double-sided printed circuit boards. However, there still remains the problem of assuring a uniform flux coating on the undersurface of the flux coated boards or substantially flat workpieces and, particularly in the case of a foam fluxer, there is still the problem of sweeping off bubbles of the foam flux or of bursting these bubbles. The present invention is designed to overcome or obviate these problems and provide a uniform, bubble-free liquid flux coating on the undersides of substantially flat workpieces which are flux coated by the fluxer 10.

In accordance with the invention, the flux coater 10 is provided with a flux draining brush 40 extending transversely of the path of travel of the workpieces and arranged to engage and wipe the flux coated undersurfaces of the workpieces immediately after these leave the flux wave 30. When the unit is not operating, brush 40 may be tilted downwardly, as illustrated in FIG. 2 in, in broken lines in FIG. 4, so that its bristles 41 are immersed in the liquid flux 15 and container 11. For the purpose of supporting brush 40 in the solid line active position and the broken line inactive position, shown in FIG. 4, the downstream end wall 12 of flux coater 10 has secured thereto a vertical leg 33 of a Z-shape extension including a horizontal leg 31 and a second vertical leg 32 extending upwardly from leg 31, this extension extending transversely of the path of travel of the workpieces. A pair of laterally spaced angle brackets 35 are supported on leg 31 of the extension, and each angle bracket 35 includes a leg 36 juxtaposed to leg 32 and adjustably and releasably secured thereto by suitable means such as wing nut assemblies 34. Brackets 35 are mirror images of each other, and the other leg 37 of each bracket has the general shape of a right triangle, with the hypotenuse being formed with a series of relatively deep notches 38 extending substantially perpendicularly inwardly therefrom. The wing nut assemblies 34 extend through vertical slots 39 in the legs 36 of brackets 35 to provide for a fine height adjustment of brush 40.

Figure 4:
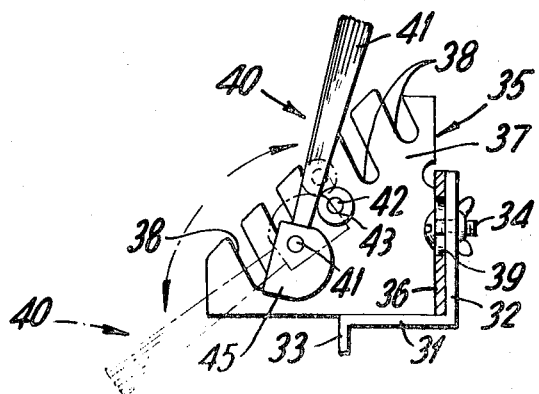
FIG. 4 is an enlarged transverse sectional view illustrating the flux draining brush and its mounting means.

As best seen in FIG. 4, notches 38 interchangeably receive a pivot shaft 41 of brush 40, to provide for rough adjustment of the height of brush 40. The notches 38 also interchangeably receive a second rod 42 which has a pair of circular stops 43 thereon. It will be noted that stop rod 42, when pivot shaft 41 is mounted in one pair of notches 38, is mounted in the next adjacent pair of notches 38 in an upward direction. One or more eccentric cams 45 are secured to pivot shaft 41 for cooperation with stops 44 in the inactive position of brush 40 to limit the movement of brush 40, in the inactive direction, to the position illustrated in FIG. 2 and, in broken lines, in FIG. 4. In this inactive position, the bristles 41 of brush 40 are immersed in the liquid flux 15 in container 11. Brush 40 may be readily moved manually between its active and inactive positions and, in the active position illustrated in FIG. 3 and in solid lines in FIG. 4, the brush 40 itself abuts against stops 43 to limit its upward movement to a position in which it slopes upwardly and in the direction of travel of the workpieces. The effective height of brush 40 may be readily adjusted by simply lifting the brush from notches 38 and replacing the pivot shaft 41 in another pair of notches, with similar relocation of stop rod 42. Fine adjustment of the height of brush 40 is effected by loosening wing nut assemblies 34 to adjust the height of brackets 35.

The flux draining brush forming the subject matter of the invention has numerous advantages. Thus, use of the brush results in the distribution of flux over the undersurface of a printed circuit board being uniform, and this allows a uniform application of preheat which, in turn, improves the result of the subsequent wave soldering or pretinning of the undersurface of the board. An additional advantage is that the flux, due to being drained back into the container, does not drop onto any following preheaters, and therefore reduces or eliminates a fire hazzard when a rosin foam flux is being used. Finally, in the inactive position of the brush, its bristles remain in the liquid flux so that suitable covers may be placed over the brush assembly and over the remainder of the top of container 11. The advantage of this is that, when it is desired to restart the operation, the flux drain brush is not stiff with gummy rosin flux residues.

While a specific embodiment of the invention has been shown and described in detail to illustrate the application of the principles of the invention, it will be understood that the invention may be embodied otherwise without departing from such principles.

What is claimed is:

1. In the pretinning and solder coating of substantially flat workpieces, such as printed circuit boards, in which workpiece surfaces initially have a flux coating applied thereto followed by removal of volatile constituents of the flux coating therefrom and application of a solder coating thereto: flux applying apparatus comprising, in combination, a container for liquid flux arranged for movement of substantially flat workpieces thereover along a path of workpiece travel; liquid flux applying means operatively associated with said container and operable to apply a coating of liquid flux therefrom to the undersurface of workpieces moved along such travel path over said container; mounting means positioned on a wall of said container downstream, relative to such path of travel, in spaced relation to said flux supplying means; a solder wiping brush mounted in said mounting means to extend across such path of travel; and means supporting said brush for pivotal movement between an active position and an inactive position; the bristles of said brush, in the active position of said brush, contacting the flux coated undersurfaces of workpieces to distribute the flux over the workpiece surfaces, to wipe excess flux therefrom and to remove any flux bubble; said bristles, in the inactive position of said brush, extending into liquid flux in said container; whereby said wiping brush controls the thickness of the layer of flux on the workpiece surfaces and redirects excess flux into said container.

2. Flux applying apparatus, as claimed in claim 1, in which said container includes an upright wall extending transversely of the path of workpiece travel downstream of said flux applying means; said mounting means comprising a support secured to said upright wall adjacent its upper edge; a pair of laterally spaced brackets mounted on said support; and a pivot shaft supported in said brackets to extend transversely of the path of workpiece travel, said brush being mounted on said pivot shaft for pivoting between its active and inactive positions.

3. Flux applying apparatus, as claimed in claim 2, in which said brackets are angle brackets each having one leg secured to an upwardly extending flange of said support; the other leg of each bracket having substantially the shape of a right triangle whose hypotenuse edge slopes upwardly and in the direction of travel of the workpieces; said hypotenuse edge of each bracket being formed with a plurality of slots spaced longitudinally therealong and extending substantially perpendicular to the associated hypotenuse edge, said slots opening outwardly to interchangeably receive said pivot shaft for adjustment of the operating height of said brush.

4. Flux applying apparatus, as claimed in claim 3, in which said one leg of each bracket is formed with a respective vertically extending slot receiving releaseable fastening means extending through respective apertures in the upright flange of said support; said vertically elongated slots providing for fine adjustment of the operating height of said brush.

5. Flux applying apparatus, as claimed in claim 3, including a stop rod extending transversely of the path of workpiece travel and interchangeably engageable in said slots; said stop rod being positioned in that pair of said slots next adjacent, in an upward direction, the pair of slots receiving said pivot shaft; said stop rod serving to limit pivotal movement of said brush to its active position.

6. Flux applying apparatus, as claimed in claim 5, including stop means on said stop rod engageable with said brush in the active position of said brush.

7. Flux applying apparatus, as claimed in claim 6, including cam means on said pivot shaft engageable with said stop means to limit pivotal movement of said brush to its inactive position.

* * * * *